Patented June 21, 1949

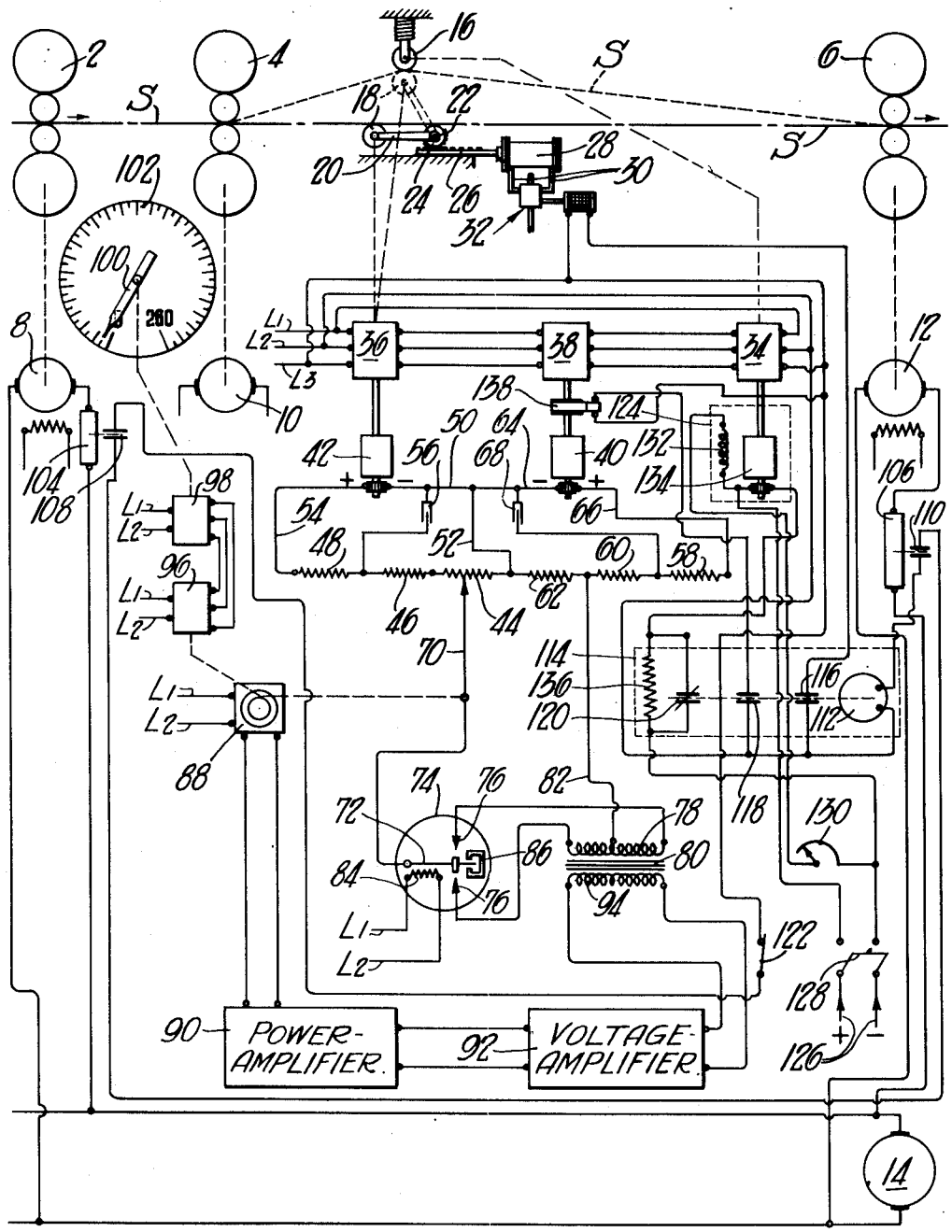

2,474,117

UNITED STATES PATENT OFFICE 2,474,117

THICKNESS GAUGE

George H. Rendel, Mount Lebanon, Pa., assignor to Carnegie-Illinois Steel Corporation, a corporation of New Jersey Application December 23, 1946, Serial No. 717,993

5 Claims. (Cl. 80—31.1)

This invention relates to a thickness gauge and more particularly to a gauge for use in gauging the thickness of strip being rolled at high speeds in a continuous hot rolling mill. By accurately and continuously determining the thickness of this strip, marked economies and improvements in the quality of the strip can be made. Conventional thickness measuring devices such as flying micrometers are inaccurate and not sufficiently rugged to withstand the impact and shock loads encountered in strip rolling. The apparatus of my invention is particularly adapted for gauging material having a thickness between .040 and .260 inch at speeds of 1000 to 3000 feet per minute. On previously known gauges most commonly used, the gauge did not determine the actual thickness, but only indicated whether the strip was too thick or too thin. My invention utilizes the difference in length between the outer and inner surfaces of a strip as it passes in an arc over the periphery of a deflector roll. The difference in length between the outer and inner strip surfaces is expressed by the equation:

(1) $$l = \frac{Lt}{r}$$

where $l$ is the differential length, L is the length of the inner strip surface as the gauging position, $t$ is the thickness of the strip, and $r$ is the radius of the deflector roll. From this the following equation is obtained:

(2) $$t = \frac{lr}{L}$$

Thus, if the difference in length between the outer and inner strip surfaces is measured and compared to the length of the inner surface measured at the surface of the deflector roll, the strip thickness at this point can be determined. As indicated by the above formulae, the outer surface of the strip is longer than the inner surface at the gauging point and therefore a differential in speed between the outer and inner surfaces exists at this point and this differential speed, which is proportional to the strip thickness, is employed to measure the strip thickness. In order to pass the strip around an arc of the roll, it must be deflected from the normal pass line between a pair of roll stands. While the hot strip rolling operation is called continuous, the operation is actually intermittent since the ends of consecutive strips are not joined together. As the leading end of a strip passes between adjacent stands, it must travel in a straight line to enable it to be fed at high speeds into the second stand. Therefore, the gauging roll around which the strip wraps must be lowered when the tail end of the strip approaches the gauging position and must remain lowered until the leading end of the succeeding strip has entered the second roll stand between which the gauge is located. The roll must then be raised into contact with the new strip. Since manual operation of this movement requires considerable attention and there is no assurance that the operator will always move the rolls at the desired time, the gauging roll must be automatically lowered and raised to obtain the best results. In order to avoid undue shock on the gauging rolls when one of the gauging rolls is raised into gauging position, the rolls, when in non-engaging position, must be rotated at a peripheral speed equal to or slightly in excess of that of the entry work roll in the preceding stand.

It is an object of my invention to provide a thickness gauge which will accurately and continuously measure the absolute thickness of a strip as it moves continuously past the gauging means.

Another object is to provide means for automatically raising and lowering a roll of the gauging device as lengths of strip enter and leave the gauging device.

Still another object is to provide apparatus for automatically rotating the gauging rolls before they are moved into gauging position.

These and other objects will be more apparent after referring to the following specification and attached drawings in which the single figure is a diagrammatic view of my invention as applied to a hot strip mill.

Referring more particularly to the drawing, the reference numerals 2, 4 and 6 indicate the last three roll stands of a hot strip mill, the stands being equipped with drive motors 8, 10 and 12, respectively. Power for driving the motors is supplied by a generator 14. The gauging apparatus is located between roll stands 4 and 6 and it will be understood that the roll stands 4 and 6, instead of being working rolls, could be pinch rolls or any type of conveying device which will maintain tension on the strip S as it passes therebetween.

The gauging apparatus comprises a spring loaded semirigidly mounted gauge roll 16 which rides on the upper or outer surface of the strip S and a movable gauge roll 18, which is adapted to contact the lower or inner surface of the strip. The roll 18 is carried on an arm 20 which is attached to a rotatable shaft 22, the latter being supported by bearings, not shown. A gear 24 is attached to the shaft 22 and engages a rack 26 which is actuated by an air cylinder 28. Air is applied to the air cylinder 28 through the conduits 30 and the flow of air is controlled through a suitable solenoid valve 32. Synchronous transmitters 34 and 36 are mechanically connected to rolls 16 and 18, respectively. The transmitters may be of any suitable type, but are preferably A. C. "Synchro-tie" machines having a three-circuit armature winding and a three-circuit field winding, the field winding being connected to an A. C. power source L1, L2 and L3. The armature circuits of the transmitters are connected to a differential receiver 38, which is also an A. C. "Synchro-tie" machine having a three-circuit armature and a three-circuit field winding. The armature of one transmitter is connected to the field windings of the receiver 38 and the armature of the other transmitter is connected to the armature winding of the receiver 38. The construction and electrical characteristics of the above combination of equipment is such that rotation of either transmitter produces a synchronous rotating magnetic field in those windings of the receiver to which it is connected. This rotating field causes the armature of the receiver to rotate an equal amount in the same direction as the rotation of the transmitter. Thus, if the armatures of both transmitters are rotated the armature of the receiver will rotate at a speed which is the algebraic sum of the speeds of rotation of the transmitters.

When air is admitted into the right hand end of air cylinder 28, the roll 18 is moved to the gauging position shown in dotted lines with the strip S being forced into an arcuate path of contact with the roll 18 and into line contact with roll 16, thus causing the rolls to rotate at speeds which are directly proportional to the lineal speeds of the inner and outer surfaces of the strip, respectively. This, in turn, causes the transmitters 34 and 36 to rotate at these respective speeds. Forward motion of the strip S rotates the transmitter 34 in a counter-clockwise direction and rotates transmitter 36 in a clockwise direction. Thus, the synchronous rotating magnetic fields produced by the transmitters are in opposite directions and consequently the armature shaft of the differential receiver 38 rotates at a speed which is directly proportional to the difference in the lineal speed of the inner and outer surfaces of the strip. The magnitude of the differential speed of the inner and outer surfaces of the strip is a function of the thickness and speed of the strip. A tachometer generator 40 is mechanically connected to the shaft of receiver 38 and its voltage output is therefore directly proportional to the differential speed of the gauging rolls and the strip speed. If the strip speed is maintained constant, the strip thickness can be visually indicated by connecting a voltmeter across the terminal of generator 40, which, for convenience, could be calibrated to read strip thickness in thousandths of an inch. However, in commercial operations, the speed of rolling varies and consequently, even though the strip thickness remains constant, the voltage output of generator 40 will vary directly with the strip speed. To take care of this condition a tachometer generator 42 is mechanically connected to the transmitter 36 so that its output varies directly with the strip speed.

As shown by Equation 2, the ratio of strip speed to differential speed of the outer and inner surfaces is constant for a given strip thickness so that the ratio of the voltages of generators 40 and 42 serves as a measure of strip thickness under conditions of varying strip speed. The ratio of the voltages of generators 40 and 42 can be measured, indicated and recorded in various ways. As shown, the voltage output from generator 42 is connected to a suitable voltage divider network comprising a slide wire 44 and resistors 46 and 48 by means of wires 50, 52 and 54. If desired, a capacitor 56 may be used in the network to smooth out the voltage ripple occasioned by the commutator bars of the armature of generator 42. The voltage output of generator 40 is connected to another voltage dividing network comprising resistors 58, 60 and 62 by means of wires 64, 52 and 66. A capacitor 68 may be used in this network to smooth out the voltage ripple caused by the commutator bars of the armature of generator 40. The negative terminals of generators 40 and 42 are connected through wires 50 and 64. The contact arm 70 of the slide wire 44 is electrically connected to a vibrating contact 72 of a converter 74. The stationary contacts 76 of the converter are connected to the primary windings 78 of an input transformer 80 and the center tap of the primary windings 78 is connected to the voltage divider network by a wire 82. Power for driving the vibrating contact 72 is obtained from an energizing coil 84 in conjunction with a permanent magnet 86, the coil 84 being connected to an A. C. source L1 and L2. The converter 74 is, in principle, a single pole, double throw switch which is operated in synchronism with the line voltage of the power supply L1 and L2 by continuously energizing the coil 84 from the power supply lines, the switch being polarized by means of the permanent magnet 86 so that one of the stationary contacts 76 will always be in contact with the vibrating contact 72 during the positive half cycle of the supply voltage and the other stationary contact will be in contact with the vibrator during the negative half cycle. The slide wire 44 is calibrated to read strip thickness in decimal parts of an inch and its contact arm 70 is mechanically connected to a motor 88 which is a reversible induction motor having two windings, one continuously energized from the A. C. source L1 and L2, and the other being electrically connected to a power amplifier 90. An electronic voltage amplifier 92 is connected to the amplifier 90 and also to the secondary winding 94 of transformer 80, the transformer functioning as an inductive coupling between the measuring circuit and the electronic voltage amplifier 92.

The above described circuit functions as follows: The voltage drop across slide wire 44 varies directly with the voltage output of generator 42 while the drop across resistor 62 varies directly with the voltage output of generator 40. The two voltages oppose each other and can be balanced by adjusting the position of the slide wire contact arm 70. When the opposed potentials are balanced, the position of the contact arm 70 represents the ratio between the voltage outputs of generators 40 and 42, thus also indicating strip thickness. Adjustment of the contact arm 70 is automatically made in the following manner. When any unbalance in potential exists between contact arm 70 and wire 82, the potential is impressed on the primary windings 78 through the vibrating contact 72 of the converter 74. This potential appears in the secondary winding 84 of the transformer as an alternating current whose magnitude is proportional to the D. C. unbalance between contact arm 70 and wire 82. This alternating current is transmitted to the voltage amplifier 92 where it is amplified from a low value of several microvolts to a higher value of several volts. From here the current is transmitted to the power amplifier 90 and thence to the balancing motor 88 causing the motor to rotate and move the contact arm 70 until the electrical balance is restored.

As previously stated, the balancing motor 88 is a reversible induction motor having two windings, one of which is continuously energized from supply lines L1 and L2 and the other being energized from the power amplifier 90 with a current whose phase relation with respect to that of the line current determines the direction of rotation and whose magnitude determines the rotational speed of the motor. Therefore, the phase relation and the magnitude of the power applied to the motor 88 are controlled by conditions existing in the measuring circuit. If the measuring circuit is balanced there is no potential to convert or amplify and the balancing motor its at rest. If unbalance exists the motor moves contact arm 70 along the slide wire 44 until balance is restored. A continuous record of the thickness can be made by attaching a recording pen to the arm 70 and providing suitable charts driven by a separate driving motor incorporated into the indicating potentiometer for this purpose. When it is desired to indicate the thickness of the strip at a point removed from the balancing circuit, a synchronous transmitter 96 is mechanically connected to the balancing motor 88 and is electrically connected to a synchronous receiver 98. A pointer arm 100 is fastened to the shaft of the synchronous receiver 98 and indicates on a dial 102 the relative position of the contact arm 70 on the slide wire 44. In the present invention the dial 102 has 260 divisions, each indicating one-thousandth of an inch. This remote indicating apparatus functions as follows: The synchronous transmitter 96 and receiver 98 are of the well known "Selsyn" type, each device having a field winding which is connected to a suitable field source L1 and L2 and a three circuit armature winding with the armature windings of the transmitter being electrically connected to those of the receivers. Rotation of the transmitter produces a simultaneous rotation in the receiver, the amount and direction of rotation being the same as that of the transmitter. Since the transmitter is driven by the balancing motor 88, which moves the contact arm 70 to maintain balance in the measuring circuit, the strip thickness will be registered on the dial 102. While only one indicating means is shown, it will be understood that several can be provided by using additional receivers 98, pointers 100 and dials 102.

As an example of the performance of the measuring circuit, it will be assumed that the strip is traveling at a speed of 1000 feet per minute and that the strip thickness is .050 inch. Under these conditions the voltage output from generator 40 may be assumed to be .50 volt and the output from generator 42, 10 volts. The resistor 62 is fixed at a low ohmic value and the resistors 58 and 60 are selected so that when generator 40 produces 0.50 volt, the voltage drop across resistor 62 will be .005 volt. The slide wire 44 also has a relatively low resistance while the resistors 46 and 48 are selected so that when generator 42 produces 10 volts, the voltage drop across the slide wire 44 is .025 volt. The convertor 74 and amplifiers 90 and 92, through the balancing motor 88, are arranged to maintain the measuring circuit in balance so that under the conditions specified, the contact arm 70 will be moved to the point where the voltage drop is .005 volt which is approximately one-fifth of the total length of the slide wire 44 and which corresponds to the mark .050 on the calibrated scale.

If the strip speed is increased to 2000 feet per minute and the strip thickness is held constant, the voltage output of generator 40 will increase to 1.0 volt and the output of generator 42 will increase to 20 volts. As a result, the voltage drop across resistor 62 will be .010 volt and that across slide wire 44 will be .050 volt so that the balance point for the measuring circuit will remain unchanged at approximately one-fifth the length of the slide wire 44. In other words, doubling the speed exactly doubles the voltage outputs of generators 40 and 42 and since the ratio of the voltages remains constant, the measuring circuit retains its balance. If, however, the strip speed is held at 1000 feet per minute and the strip thickness is increased to .10 inch, the voltage output of generator 40 will increase to 1.0 volt while the output of generator 42 will remain at 10 volts. Under these conditions the drop across resistor 62 becomes .010 volt, while that across slide wire 44 remains at .025 volt. The balance point for the measuring circuit therefore moves approximately two-fifths of the total length of the slide wire 44, which point corresponds to .10 inch on the calibrated scale, the contact arm 70 being moved to this position by the motor 88. From the foregoing it is seen that unbalance in the measuring circuit results from changes in the gauge of the strip and not from changes in speed.

Automatic means are provided for controlling the solenoid valve 32. For this purpose, load relays 104 and 106 are connected in circuit with the motors 8 and 12, respectively, and are provided with contacts 108 and 110 which close when the strip enters the respective roll stands and opens when the strip leaves the stands. Contacts 108 and 110 are connected in series with the coil 112 of a control relay 114 which has normally open contacts 116 and 118 and a normally closed contact 120. Power for this circuit is obtained from the A. C. power source L2 and L3 and includes the disconnecting switch 122. The contact 116 is connected in series with the coil of the solenoid valve 32 and the arrangement is such that when contact 116 is closed the solenoid coil of valve 32 is energized and air is admitted to the right side of cylinder 28 to raise the roll 18. Conversely when contact 116 opens the solenoid coil is deenergized and air is admitted to the left hand end of cylinder 28 causing the roll 18 to be lowered. The construction of valve 32 is such that when air is admitted to one end of the cylinder, the opposite end is simultaneously vented.

The rotation of the rolls 16 and 18, when in non-gauging position, is accomplished as follows: a variable speed motor 124 is mechanically connected to roll 16 through the shaft of transmitter 34. Motor 124 is preferably a shunt wound D. C. machine supplied from the D. C. power source 126. A disconnecting switch 128 controls the flow of power to the motor 124. The speed of motor 124 is regulated by means of an adjustable rheostat 130 connected in circuit with the shunt field 132 of the motor. The motor armature 134 is connected to the D. C. source 126 through the normally closed contact 120. A resistor 136 is connected across the contact 120. When contact 120 is closed the resistance 136 is shorted out and the motor 124 develops full power. Since the motor drives roll 16 through the shaft of transmitter 34, which is electrically connected to transmitter 36 through the differential receiver 38, the motor 124 in rotating transmitter 34 will also rotate transmitter 36 if the armature of the receiver 38 is prevented from rotating. The direction of rotation of transmitter 36 will be opposite to and at the same speed as that of transmitter 34. Since transmitter 36 is connected to roll 18, the rolls 16 and 18 will be driven at synchronous speed. Rotation of the receiver 38 is prevented by a magnetic brake 138 which is so constructed that it is applied when its operating coil is deenergized. The operating coil is connected to the power source L2 and L3 through the normally open contact 118 so that the brake is applied when the coil 112 of relay 114 is deenergized, which condition also moves the roll 18 to the non-gauging position. The purpose of resistor 136 is to provide limited armature current to motor 124 when the control relay 114 operates to raise the roll 18 into engaging position. When contact 120 opens, the resistor 136 is connected in series with the armature 134 and the ohmic resistance of resistor 136 is such that the torque output of motor 124 is limited to a value which is just sufficient to overcome the no-load resistance of the motor and the frictional load of roll 16.

The operation of the device is as follows:

With no strip passing through the rolls 4 and 6, the position of the various parts of the gauge and operating circuits will be that shown in full lines in the drawings. Under these conditions the contact 120 is closed and the rolls 16 and 18 will be rotated. When a strip S passes through the roll stands 2 and 6 the contacts 108 and 110 will close, thus completing the circuit to coil 112 to close contacts 116 and 118 and open contact 120. The closing of contact 116 completes the circuit to the valve 32 causing the roll 18 to rise to the gauging position shown in broken lines. Closing contact 118 releases brake 138 permitting the rotation of receiver 38. Opening contact 120 places the resistor 136 in series with the armature 134 of motor 124, thus reducing the motor torque output. With the roll 18 in its broken line position, the strip S passes around an arc of the roll 18 with the roll 16 bearing on the top thereof. The strip causes the rolls 16 and 18 to rotate at the speed of the strip at the top and bottom points and the gauge functions to measure the gauge of the strip in the manner described above. As soon as the trailing end of the strip S passes out of the rolls 2, the contact 108 opens and deenergizes the coil 112, which in turn opens contacts 116 and 118 and closes contact 120. Opening contact 116 lowers the roll 18 to its full line position. Opening contact 118 applies the brake 138 which prevents the transmitter 38 from rotating. Closing contact 120 causes the motor 124 to develop full torque, thus again driving rolls 16 and 18 at a speed equal to or slightly greater than that of the rolls of roll stand 4. The apparatus will remain in this position until the leading edge of the next succeeding strip passes through the roll stand 6. If it is desired to return the gauge and associated mechanism to the normal position at any time the strip is passing through both stands 2 and 6, it is only necessary to open the switch 122, thus deenergizing coil 112.

While one embodiment of my invention has been shown and described it will be apparent that other adaptations and modifications may be made without departing from the scope of the following claims.

I claim:

1. Apparatus for gauging the thickness of moving strip, comprising a rotatable roll around an arc of which the strip is adapted to pass, a rotatable roll positioned to ride on said strip at the point where the strip is in contact with said first named roll, said rolls being driven by said moving strip, means connected to be driven at a speed proportional to the speed of the first named roll, means connected to be driven at a speed proportional to the speed of the second named roll, a differential receiver connected to both of said means for obtaining the difference in their speeds, a tachometer generator driven by said differential receiver, a tachometer generator driven at a speed proportional to the speed of the first named roll, and means for comparing the voltage outputs of the generators to indicate the gauge of said strip.

2. Apparatus for gauging the thickness of moving strip, comprising a rotatable roll around an arc of which the strip is adapted to pass, a rotatable roll positioned to ride on said strip at the point where the strip is in contact with said first named roll, said rolls being driven by said moving strip, a motion transmitting device connected to be driven at a speed proportional to the speed of the first named roll, a second motion transmitting device connected be driven at a speed proportional to the speed of the second named roll, a differential receiver connected to said motion transmitting devices for obtaining the difference in their speeds, a tachometer generator driven by said differential receiver, a tachometer generator driven at a speed proportional to the speed of the first named roll, and means for comparing the voltage outputs of the generators to indicate the gauge of said strip.

3. Apparatus for gauging the thickness of elongated strip moving between two pairs of driven work rolls or the like, said strip normally moving in a plane passing through both roll passes, but being movable out of said normal pass line during gauging, which apparatus comprises a rotatable gauging roll around an arc of which the strip is adapted to pass, a rotatable gauging roll positioned to ride on said strip at the point where the strip is in contact with said first named gauging roll, said gauging rolls being driven by said moving strip, means connected to said gauging rolls for indicating the gauge of said strip, said gauging rolls being normally located on opposite sides of the strip, said second named gauging roll being spaced from the normal pass line, means for moving said first named gauging roll from its normal position across the normal pass line to its gauging position adjacent the second named gauging roll, and means responsive to the position of the strip for operating said moving means to move said first named gauging roll to its gauging position when the strip is passing through both pairs of work rolls.

4. Apparatus for gauging the thickness of elongated strip moving between two pairs of driven work roll or the like, said strip normally moving in a plane passing through both roll passes, but being movable out of said normal pass line during gauging, which apparatus comprises a rotatable gauging roll around an arc of which the strip is adapted to pass, a rotatable gauging roll positioned to ride on said strip at the point where the strip is in contact with said first named gauging roll, said gauging rolls being driven by said moving strip, means connected to said gauging rolls for indicating the gauge of said strip, said gauging rolls being normally located on opposite sides of the strip, said second named gauging roll being spaced from the normal pass line, means for moving said first named gauging roll from its normal position across the normal pass line to its gauging position adjacent the second named gauging roll, means for rotating said gauging rolls in synchronism when they are out of gauging position, and means responsive to the position of the strip for operating said moving means to move said first named gauging roll to its gauging position when the strip is passing through both pairs of work rolls.

5. Apparatus for gauging the thickness of elongated strip moving between two pairs of driven work rolls or the like, said strip normally moving in a plane passing through both roll passes, but being movable out of said normal pass line during gauging, which apparatus comprises a rotatable gauging roll around an arc of which the strip is adapted to pass, a rotatable gauging roll positioned to ride on said strip at the point where the strip is in contact with said first named gauging roll, said gauging rolls being driven by said moving strip, said gauging rolls being normally located on opposite sides of the strip, said second named gauging roll being spaced from the normal pass line, a motion transmitting device connected to be driven at a speed proportional to the speed of the first named gauging roll, a second motion transmitting device connected to be driven at a speed proportional to the speed of the second named gauging roll, a differential receiver connected to said motion transmitting devices for obtaining the difference in their speeds, a tachometer generator driven by said differential receiver, a tachometer generator driven at a speed proportional to the speed of the first named gauging roll, means for comparing the voltage outputs of the generators to indicate the gauge of said strip, means for moving said first named gauging roll from its normal position across the normal pass line to its gauging position adjacent the second named gauging roll, a variable speed motor mechanically connected to said second motion transmitting device, a brake for stopping rotation of said differential receiver, an electrical control circuit operable when there is a load on the motors of both of the pairs of driven rolls to move said first named gauging roll to its gauging position when the strip is passing through both pairs of driven rolls, to release said brake and to limit the torque on said variable speed motor to a value just sufficient to overcome the no-load resistance thereof and the frictional load of the second named gauging rolls, said control being operable when there is no load on the motor of either of the pairs of driven rolls to apply said brake and rotate said variable speed motor to thereby rotate said gauging rolls in synchronism.

GEORGE H. RENDEL.

REFERENCES CITED

The following references are of record in the file of this patent:

UNITED STATES PATENTS

| Number | Name | Date |
|---|---|---|
| 1,897,472 | French | Feb. 14, 1933 |
| 2,051,018 | Umansky | Aug. 11, 1936 |
| 2,077,146 | Hart | Apr. 13, 1937 |